(12) United States Patent
Biberger

(10) Patent No.: US 9,394,184 B1
(45) Date of Patent: Jul. 19, 2016

(54) SYSTEM FOR AND METHOD OF REGULATING CALCIUM HARDNESS FOR A BODY OF WATER

(75) Inventor: Maximillian A. Biberger, Scottsdale, AZ (US)

(73) Assignee: HITEK AQUA SYSTEMS, Tempe, AZ (US)

( * ) Notice: Subject to any disclaimer, the term of this patent is extended or adjusted under 35 U.S.C. 154(b) by 740 days.

(21) Appl. No.: 12/433,715

(22) Filed: Apr. 30, 2009

Related U.S. Application Data

(60) Provisional application No. 61/126,171, filed on Apr. 30, 2008.

(51) Int. Cl.
  *C02F 1/46* (2006.01)
  *C02F 1/28* (2006.01)

(52) U.S. Cl.
  CPC *C02F 1/28* (2013.01); *C02F 1/4602* (2013.01)

(58) Field of Classification Search
  CPC .............. C02F 1/4602; C02F 1/46104; C02F 2103/02; C02F 2103/023; C02F 2103/42; C02F 2201/4612; C02F 2103/46125; C02F 2103/46145; C02F 2103/4165; C02F 2209/055; C02F 2209/10
  USPC ........................ 205/743, 744; 204/228.6, 242
  See application file for complete search history.

(56) References Cited

U.S. PATENT DOCUMENTS

| | | |
|---|---|---|
| D138,325 S | 7/1944 | Pool |
| 3,162,470 A | 12/1964 | Davidson et al. |
| D242,618 S | 12/1976 | Milo |
| D254,266 S | 2/1980 | Tableriou |
| 4,435,095 A | 3/1984 | Jones et al. |
| 4,510,487 A | 4/1985 | Wolfe et al. |
| 4,781,810 A | 11/1988 | Tucker |
| 4,900,432 A | 2/1990 | Arnold et al. |
| 4,940,946 A | 7/1990 | Nazaryan |
| 5,055,183 A | 10/1991 | Buchan |
| 5,115,222 A | 5/1992 | Peralta et al. |

(Continued)

FOREIGN PATENT DOCUMENTS

| | | |
|---|---|---|
| DE | 19921436 A1 | 4/2000 |
| EP | 821514 A1 | 1/1998 |

(Continued)

OTHER PUBLICATIONS

Trebbe et al., A new calcium sensor based on ion selective conductometric-microsensors membranes and features, (2001), Fresenius J. Anal. Chem. 371:734-739.*

(Continued)

*Primary Examiner* — Arun S Phasge
(74) *Attorney, Agent, or Firm* — Haverstock & Owens LLP

(57) ABSTRACT

A method of regulating water hardness for an aquatic recreational body of water by the steps of determining the water hardness, preferably determining the calcium ion content, and reducing the water hardness, preferably removing the calcium ions, based on a function of the determined water hardness and a target water hardness range using electrochemically assisted ion exchange technique. A system for regulating water hardness for an aquatic recreational body of water comprising a water hardness sensor, a water hardness reduction unit, and a control circuit in communication with the sensor and the water hardness reduction unit. Preferably the water hardness reduction unit uses an electrochemically assisted ion exchange process.

18 Claims, 6 Drawing Sheets

(56) References Cited

U.S. PATENT DOCUMENTS

| | | | |
|---|---|---|---|
| 5,124,960 | A | 6/1992 | Miller et al. |
| 5,152,610 | A | 10/1992 | Hallett |
| 5,169,236 | A | 12/1992 | Iest |
| 5,189,350 | A | 2/1993 | Mallett |
| 5,422,014 | A | 6/1995 | Allen et al. |
| 5,518,635 | A | 5/1996 | Kohlman |
| D371,824 | S | 7/1996 | Price et al. |
| 5,681,110 | A | 10/1997 | Burzacchi |
| 5,788,826 | A * | 8/1998 | Nyberg .................. 204/536 |
| 5,996,138 | A | 12/1999 | Kentch |
| 6,113,858 | A | 9/2000 | Tang et al. |
| D432,206 | S | 10/2000 | Stoltz et al. |
| D439,313 | S | 3/2001 | Wey et al. |
| 6,223,359 | B1 | 5/2001 | Oltmanns et al. |
| 6,225,900 | B1 | 5/2001 | Keon et al. |
| 6,228,272 | B1 | 5/2001 | Gola |
| 6,238,553 | B1 | 5/2001 | Lin |
| 6,294,086 | B1 | 9/2001 | Reeves |
| 6,309,538 | B1 | 10/2001 | Khan |
| 6,340,431 | B2 | 1/2002 | Khan |
| 6,476,721 | B1 | 11/2002 | Diebold |
| 6,579,446 | B1 | 6/2003 | Teran et al. |
| 6,653,842 | B2 | 11/2003 | Mosley et al. |
| 6,697,706 | B2 | 2/2004 | Gardner, Jr. |
| 6,713,298 | B2 | 3/2004 | McDevitt et al. |
| D489,431 | S | 5/2004 | Antunez |
| 6,792,956 | B2 | 9/2004 | Bredo et al. |
| 6,958,693 | B2 | 10/2005 | Rothgeb et al. |
| 7,037,038 | B1 | 5/2006 | Haski et al. |
| D526,382 | S | 8/2006 | Thompson |
| D537,913 | S | 3/2007 | Biberger et al. |
| D559,943 | S | 1/2008 | Mercer et al. |
| 7,651,663 | B2 * | 1/2010 | Ayala et al. .................. 422/82.09 |
| 2001/0045380 | A1 | 11/2001 | Khan |
| 2002/0035403 | A1 | 3/2002 | Clark et al. |
| 2002/0195403 | A1 * | 12/2002 | Takeda et al. .................. 210/749 |
| 2003/0227394 | A1 | 12/2003 | Rothgeb et al. |
| 2004/0031329 | A1 | 2/2004 | Carpenter et al. |
| 2004/0066313 | A1 | 4/2004 | Ong et al. |
| 2004/0208499 | A1 | 10/2004 | Grober |
| 2005/0029124 | A1 * | 2/2005 | Holmes et al. .................. 205/687 |
| 2005/0220169 | A1 | 10/2005 | McGowan-Scanlon |
| 2005/0225766 | A1 | 10/2005 | Hansen et al. |
| 2005/0279677 | A1 | 12/2005 | Lin |
| 2006/0096927 | A1 | 5/2006 | Clukies |

FOREIGN PATENT DOCUMENTS

| | | |
|---|---|---|
| WO | 2003087501 A1 | 10/2003 |
| WO | 2003091668 A2 | 11/2003 |

OTHER PUBLICATIONS

"Water Chemistry for Swimming Pools," North Carolina Department of Environment and Natural Resources, available on the Internet archive at <http://web-archive.org/>, Dec. 19, 2002, 12 pgs.

Rogers, David A., Notice of Allowability mailed Nov. 30, 2009, for U.S. Appl. No. 11/165,478, 3pgs.

Griffin, William R., "Maintaining Swimming Pools, Spas, Whirlpool Tubs, and Saunas." 2001.

Non-Final Office Action dated Jun. 19, 2009, U.S. Appl. No. 11/165,478, filed Jun. 22, 2005, Felix, Edward.

* cited by examiner

SYSTEM FOR AND METHOD OF REGULATING CALCIUM HARDNESS FOR A BODY OF WATER

RELATED APPLICATIONS

This Patent Application claims priority under 35 U.S.C. §119(e) of U.S. Provisional Patent Application, Ser. No. 61/126,171, filed Apr. 30, 2008, and entitled "SYSTEM AND METHOD OF REGULATING CALCIUM HARDNESS FOR A BODY OF WATER." The Provisional Patent Application, Ser. No. 61/126,171, filed Apr. 30, 2008, and entitled "SYSTEM AND METHOD OF REGULATING CALCIUM HARDNESS FOR A BODY OF WATER" is also hereby incorporated by reference in its entirety.

FIELD OF THE INVENTION

The present invention relates generally to the field of water regulation. More specifically, the present invention relates to a system for and a method of automated regulation of calcium hardness and total dissolved solids in a body of water.

BACKGROUND OF THE INVENTION

The maintenance and upkeep of recreational aquatic facilities, such as pools, saunas, fountains, spas, and hot tubs, can be burdensome, time-consuming, and costly. This is in large part due to the rigorous demands of manual monitoring and regulating the hardness in the water found in an aquatic facility (hereinafter "recreational water"), the pH of the recreational water, and the need to regulate the chemistry to prevent bacterial and fungal growth. Further, this upkeep is environmentally burdensome on the water supply, especially in the dryer hotter portions of the country, due to the need to replace the recreational water when the water hardness becomes too high. This water hardness is caused by the high evaporation rates, which concentrates the minerals in the aquatic facility and thus requires replacement periodically because of excessive hardening of the water, typically every one to five years. The water evaporation rates for outdoor aquatic facilities can reach over 100 inches per year in the Southwest. This hardened water is also an environmental detriment in that the drained recreational water is not useful for other purposes without treatments to remove chemicals and other substances commonly found in recreational water.

Recreational water hardness generally is proportional to the content of certain minerals and chemicals in the water, particularly cations such as calcium and magnesium. Generally, the more cations dissolved in the water, the harder the water is, and water hardness is generally measured as an equivalent amount of calcium carbonate ($CaCO_3$) or sometimes calcium content alone.

Thus, if the calcium content of the recreational water is too low, the recreational water hardness is also low. If the calcium content remains low, this can result in the detrimental effect of leeching of minerals out of the walls of the aquatic facility, which in turn can cause wall deterioration, and eventually lead to unsightly changes in the aquatic facilities surfaces and the possibility of water leaks in the aquatic facility. If, on the other hand, the calcium content of an aquatic facility is too high, then generally the recreational water hardness is also high. If the calcium content remains high, the detrimental effect of calcium deposits forming and scaling can occur, thereby forming unsightly stains, including white lines, on the surfaces and walls of the aquatic facility. Such staining can further lead to expensive cleaning or repair bills of the aquatic facility. Also, the harder the water, i.e. high calcium content, increasing amounts of chemicals are needed to maintain the status quo of the recreational water chemistry, such as pH. This occurs because many of the added chemicals react with the high calcium content in the water to form salts.

Furthermore, if the calcium content of the aquatic facility increases, so does the amount of total dissolved solids (TDS) in the water. Generally, a high calcium hardness level can cause a high level of TDS in the water. Calcium hardness is only one part of TDS. TDS refers to all minerals, chemicals, cations, anions, inorganic salts, and organic matter dissolved in water (hereinafter collectively referred to as "dissolved solids"). Thus, TDS includes water hardness, alkalines, chlorides, bromides, silicates, sulfates, cyanuric acid, and organic compounds. Each time something is added to recreational water, such as a sanitizer, a pH adjusting chemical, a conditioner, a tile/surface cleaner, an algaecide, and the like, the amount of TDS in the recreational water can increase. This can lead to a buildup of TDS.

Typically, particularly when temperature is high and humidity is low, the recreational water in the aquatic facility can quickly evaporate, leaving behind undesirable dissolved solids in the aquatic facility. Because the water can evaporate but the TDS do not evaporate over time there is a buildup of TDS. When the level of TDS in an aquatic facility is too high to cost effectively regulate the water chemistry, the recreational water must be completely or partially drained and the aquatic facility refilled with a fresh supply of water. In areas, such as the Southwest, where water is a scarce environmental resource, the requirement to drain and refill the water of the aquatic facility can be expensive, wasteful, and have a detrimental environmental impact. What is needed is a cost-effective system, method and apparatus to control the recreational water calcium hardness and total dissolved solids and thus eliminate or extend the interval between recreational water replacement.

BRIEF SUMMARY OF THE INVENTION

The invention allows for the regulation of water hardness and preferably the calcium ion content of body of water. Excess water hardness interferes with the regulation of other recreational water parameters such as pH thus requires excessive use of other chemicals. At some point in time, the practical solution is to drain and refill the facility. Thus by regulation of water hardness, the need to replace water is eliminated or interval is increased between needing to drain and refill the water within a recreational aquatic facility, such as spas, pools, and hot tubs. In other words, this invention provides a less expensive and more environmentally friendly means for controlling water hardness of aquatic facilities and provides a solution to the problem of high levels of calcium scaling in a body of water.

Proper use of the method and system as set forth herein adjusts levels of water hardness and total dissolved solids in recreational water to maintain levels that prevents leaching of the aquatic facility and does not require excessive amounts of chemicals to regulate other aspects of the water chemistry.

One aspect of the present invention is for a method of regulating hardness of a recreational body of water. Preferably, the body of water is recreational water for a recreational aquatic facility, such as a pool, fountain, spa, sauna, or hot tub. In a first step, a representative determination of hardness of the body of water is made. In a second step, processing parameters are determined based on the water hardness and a target hardness range. The water hardness can be determined either through an automated means or manually. In a third step, the recreational body of water is processed to reduce the water hardness according to processing parameters. Processing parameters can include variables such as the measured water hardness, the number of hours of operation of the water hardness unit since regeneration, temperature, humidity, the time of year and heuristic information on how the water hardness changes over time. Processing parameters can also include system parameters variables such as the size of the body of water, a processing rate for reducing water hardness of the system, a configurable target water hardness range and a configurable threshold. From these parameters, preferably water processing sequences and processing rates are generated. In one embodiment, the process to reduce the water hardness is implemented with an electrochemically assisted ion exchange process. In another embodiment, the electrochemically assisted ion exchange process is configured to remove calcium ions, typically in the form of calcium carbonate ion ($CaCO_3^{2-}$), from the water. One description of this process is disclosed in the U.S. Pat. No. 5,788,826 titled "Electrochemically Assisted Ion Exchange" to Nyberg which is herein incorporated by reference in its entirety. After a period of use, the device configured to remove ions will become saturated with captured ions and regeneration of the ion removal device is required. Therefore, in a further embodiment, the method includes a step of electrochemical regeneration of the ion capture. Regeneration involves the reversal of the voltage polarity of the electric field used to capture the ions from the water. This releases captured ions into solution where the ion and anion rich effluent is flushed from the apparatus and not back into the aquatic facility. The apparatus is now able to resume the removal of ions from the body of water at the aquatic facility. In one embodiment, the method of determining the water hardness or total dissolved solids is performed manually. In one embodiment the electrochemically assisted ion process is configured to capture ions. In another embodiment, a determination of the water hardness is based on the calcium content of the body of water. An ion specific electrode can be used to measure water hardness. Other means of determining water hardness are contemplated. A manual determination of the water hardness can be made and used on the step of determining processing parameters. In another embodiment of the present invention, the processing parameters include processing time intervals and processing rates. In another embodiment of the present invention, a threshold is used to selectively enable and disable the electrochemically assisted ion exchange process. If the determined water hardness is above or equal to the threshold, then the electrochemically assisted ion exchange process is enabled. If the determined water hardness is below the threshold, then water from the aquatic facility is not processed by the electrochemically assisted ion exchange process. The water hardness can be determined either through an automated means or manually. Preferably the threshold is programmable. In another embodiment of the invention, the duration and rate at which the electrochemically assisted ion exchange process will flow is a function of the determined water hardness and other configurable parameters. These other configurable parameters can include variables such as the size of the water facility, the flow rate through the electrochemically assisted ion exchange process, the processing efficiency of the electrochemically assisted ion exchange process, and the hours of usage by the electrochemically assisted ion exchange device since the last regeneration. The advantage of this embodiment is that it minimizes the number of times the water hardness needs to be determined which as result prevents excessive use of the device for determining the water hardness, requires less power, and lowers cost. A single determination of water hardness can be used to enable the process for a substantial time period.

A second aspect of the present invention is for a system for regulating water hardness of a recreational body of water. In the preferred embodiment, the system comprises a means for detecting a representative attribute of the water hardness for the body of water, a water hardness reduction device coupled to the recreation water, and a control module in communication with the means for determining the water hardness and the water reduction unit. The means for determining the water hardness and the hardness reduction device can be coupled to the recreational water by but not limited to pumps, pipes, hoses and channels. The control module can be co-located with the water hardness reduction device or located separately. Preferably, the water hardness reduction apparatus uses an electrochemically assisted ion exchange process. The means for determining the water hardness can be an automated instrument or performed manually by an operator and communicated to the electronics control module manually. In one embodiment, the water hardness reduction apparatus is configured to remove at least calcium ions and calcium carbonate ions from the water. In a further embodiment, the water hardness reduction device is capable of regeneration wherein the effluent from regeneration is not mixed back with the recreation water. In a further embodiment, the system is configured as a portable unit with a recreational water inlet, a regulated water outlet, and a regeneration effluent outlet. In another embodiment, the means for detecting the water hardness is a sensor measuring the calcium content of the water and can be detected by using an ion specific electrode. In a further embodiment, the means for detecting the water hardness is a sensor detecting the total dissolved solids in the recreational water. In another embodiment, the electronics-control module determines if the water hardness is within a target water hardness range and if the determined water hardness is above a threshold, then the water hardness reduction unit processes the recreational water. In another embodiment, the control electronics determines water processing parameters including a processing interval and processing rated based on the determined water hardness and a target water hardness range. This determination can include parameters such as the volume of the recreational water body, the efficiency of the hardness reduction device, and the amount of time since the last regeneration of the hardness reduction device.

A third aspect of the present invention is for a method of manufacturing of a system for regulating water hardness of a recreational body of water. A sensor is provided for determining the water hardness of the body of water. An apparatus reduces the water hardness when appropriate. The apparatus is coupled with the recreational body of water. A control module coupled to the sensor, and to the apparatus for reducing water hardness. In one embodiment, the provided apparatus for reducing the water hardness is based on an electrochemically assisted ion exchange process. In another embodiment, the apparatus for reducing the water hardness has a regeneration capability which produces a regeneration effluent which is kept separate from the recreational body of water.

It is to be understood that the terminology used herein is for the purpose of describing particular aspects only and is not intended to be limiting. In this specification and in the claims which follow, reference will be made to a number of terms which shall be defined to have the following meanings: it will be understood that, as used in the specification and the appended claims, the singular forms "a," "an," and "the" include plural referents unless the context clearly dictates otherwise. "Optional" or "optionally" means that the subsequently described event or circumstance can or cannot occur, and that the description includes instances where the event or circumstance occurs and instances where it does not. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Additional features and advantages of the invention will be set forth in the description which follows, and in part will be obvious from the description, or can be learned by the practice of the invention. The features and advantages of the invention can be realized and obtained by means of the instruments and combinations particularly pointed out in the appended claims. These and other features of the present invention will become more fully apparent from the following description and appended claims. Further, such features of the present invention can be learned by the practice of the invention as set forth hereinafter.

BRIEF DESCRIPTION OF THE DRAWINGS

In the drawings, like reference numbers are used when describing the same elements. Additionally, the left-most digit(s) of a reference number typically identifies the drawings in which the reference number first appears.

DETAILED DESCRIPTION OF THE PRESENT INVENTION

The present invention discloses a method, a system, and a method of manufacture for regulating the water hardness of a body of water. Preferably, the body of water is water in recreational aquatic facilities, such as spas, hot tubs, pools, saunas, and the like. However, this invention further can be applied to other types of bodies of water. Further, in accordance with the preferred embodiment, the water chemistry being regulated by the present invention is one of, water hardness, total dissolved solids, or a combination of both. In one embodiment, the water chemistry being regulated is calcium hardness, although the other mineral ions effecting water hardness can also be regulated. Also, more than one component of the water chemistry can be regulated at one time.

Figure 1A:
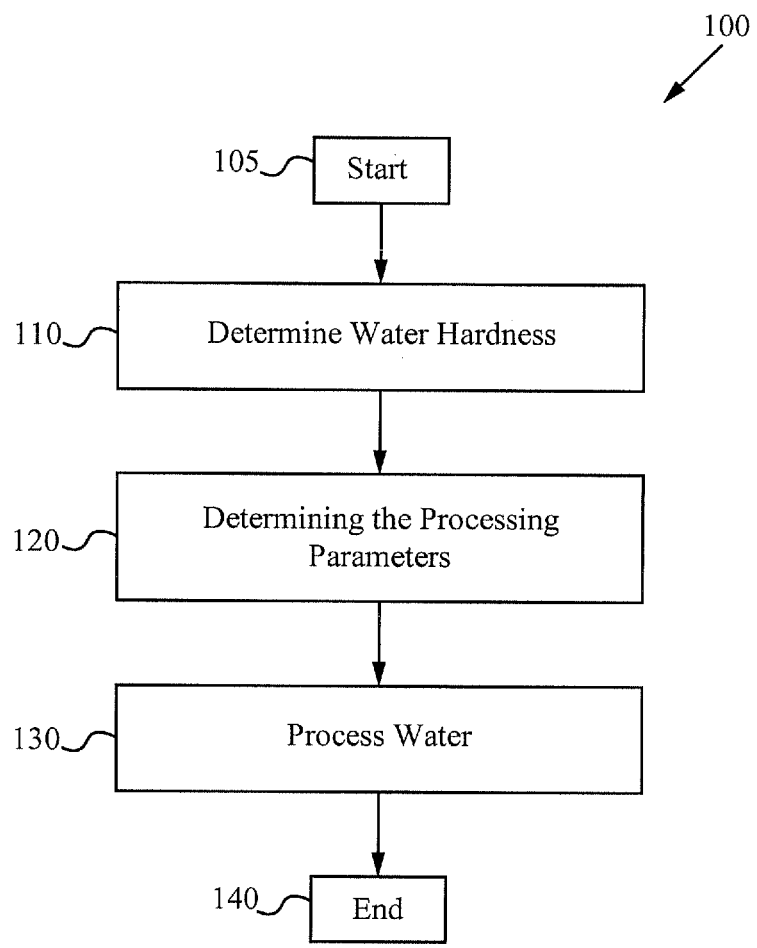
FIG. 1A is a flow chart illustrating the steps for the method of regulating the water hardness of a body of water in accordance with an embodiment of the present invention.

FIG. 1A illustrates a method 100 of regulating the hardness of a body of water in accordance with one embodiment of the present invention. In a step 105, the procedure 100 begins. One skilled in the art will appreciate that this step could include any parameter initialization or configuration as required for the execution of the following processing steps. In a step 110, an attribute of the body of water is processed to determine an estimated level of hardness in the body of water or an estimate of the water calcium content. The determination of the water hardness can be done by an automated means or manually. A number of attributes can be measured which are representative of the water hardness. A representative measurement of the water hardness can be made by measuring the ion content with an ion probe. A measurement of a specific ion, for example a calcium carbonate ion ($CaCO_3^{-2}$), can be made with an ion specific probe. Other techniques for obtaining a direct or indirect measurement of measuring water hardness can include chemical tests, unit volume weight measurements, or conductivity measurements of the water.

In a step 120, water processing parameters are determined as a function of the representative measurement of the water hardness and a target range for the water hardness. A typical target water hardness level for calcium is between 200 and 400 parts per million. The determination of processing parameters can incorporate a number of system parameters such as the size of the recreational body of water, the temperature of the water, the processing rate of the water hardness reduction device, and the number hours which the water processing device has run since changing, cleaning, or regeneration. The water processing parameters can specify time intervals and time sequences for processing water and a processing rates for the water hardness reduction device to operate. As an example, the step of determining water processing parameters could specify, using system parameters and the target water hardness range, that the water hardness reduction device needs to run for a series of X periods, for Y hours each, at a flow processing rate of Z gallons/hour to bring the hardness within the target range. This method has the advantage of not requiring a continuous monitoring of the hardness level of the recreational water body and thus potentially saving the energy and resources required to make a water hardness determination. Further, it saves any potential system wear associated with starting and stopping the water hardness reduction apparatus and associated components such as pumps and valves.

In step 130 that water is processed to reduce the water hardness. Preferably in this step, an electrochemically assisted ion exchange process is performed. As a part of this process, it is determined if the water hardness removal device needs to be regenerated. The decision to regenerate can be based on a number of variables. The decision for regeneration can be based on a fixed time interval, a cumulative number of hours of operation, or a function based on the determined water hardness level. As part of the regeneration process, the fluids in water processing unit are isolated from the recreational water. This prevents the released calcium ions and other water hardness agents from getting back into the recreational water body. Next, the voltage polarity on the anode and cathode are reversed which causes the captured ions to be released into the fluid remaining or flowing through the water processing system. This ion rich effluent is flushed from the water processing unit and is preferably disposed of separately from the recreational body of water. The voltage polarity is then switched back to its original state and the device is again ready to capture ions and reduce the hardness of the water. The water processing unit is then re-coupled with the same or another recreational body of water and is ready to continue processing. It will be appreciated by one skilled in the arts that isolation of the water processing unit, the flushing, and the removal of the effluent can be accomplished with but not limited to pumps, valves, pipe, hoses and other water separation devices.

It will be readily apparent to those skilled in the art that the procedure 100 can be performed continuously, cyclically, and/or in batches. Also, the procedure 100 can be performed more than once. In one embodiment, the procedure 100 is performed repeatedly over a programmable duration of time, for optimal and accurate determinations and adjustments, if necessary, of the level of calcium hardness for the body of water. In another embodiment, the procedure 100 can be cycled through a set number of repetitions, such that there is a time gap between each cycle of procedure 100. This embodiment advantageously allows for the water hardness reduction method to be accomplished periodically. Also, the time gap in between each cycle of the procedure 100 allows for recirculation of the body of water, for more accurate readings, and also for units from different locations of the body of water to be processed using the procedure 100.

Figure 1B:
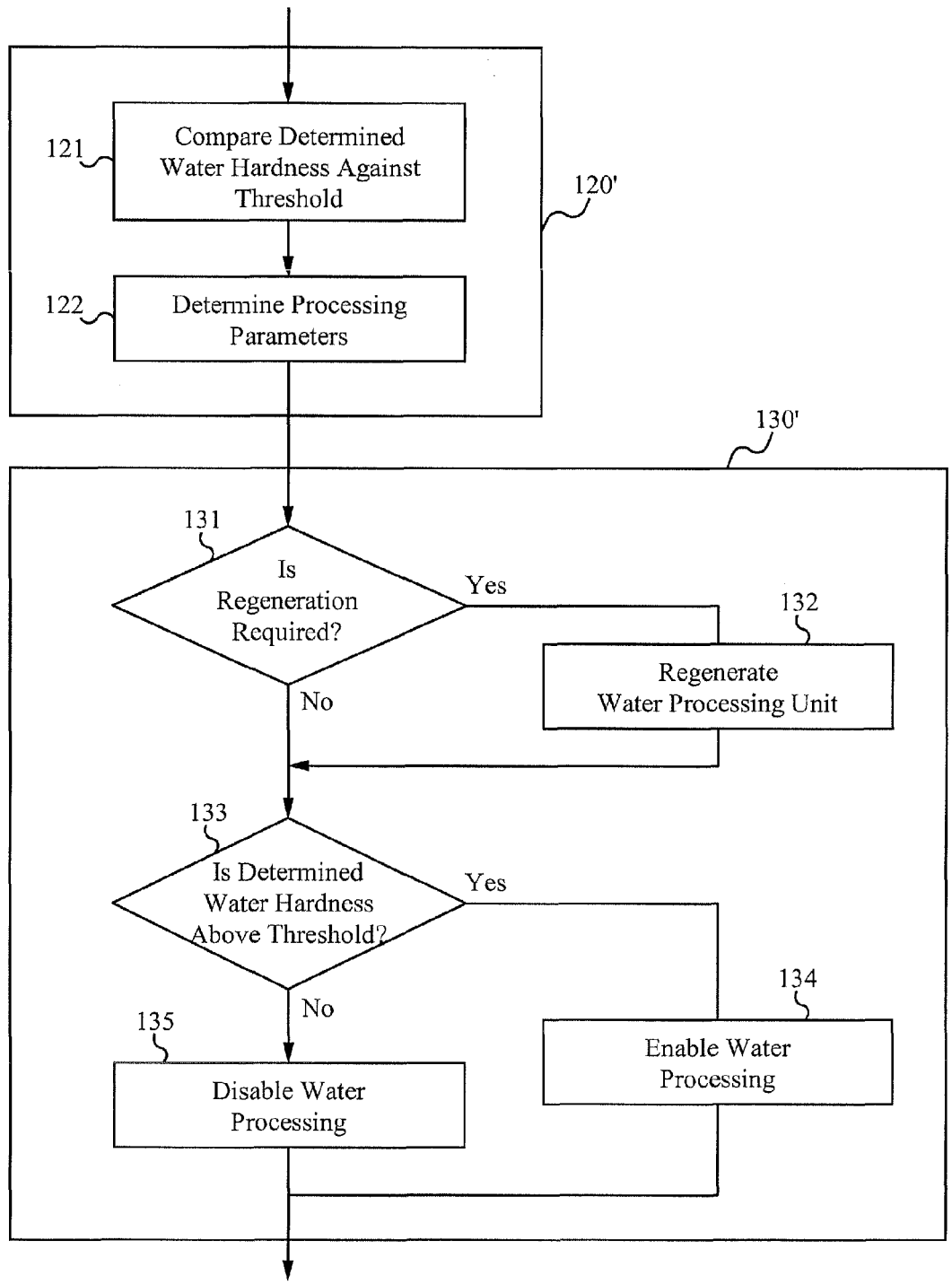
FIG. 1B is a flow chart illustrating the steps for regulating water hardness where the enabling of the water processing process is determined by comparing the water hardness to a threshold.

FIG. 1B shows a simple, but more detailed, implementation of the method steps, "determining the processing parameters" 120' and the step of "processing the water according to processing parameters" 130'. The implementation of step "determining processing the system parameters" 120' first determines a differential between the determined water hardness and 121 and a threshold. This differential can be manually calculated or through computing machinery. Preferably the threshold is configurable. One skilled in the art will appreciate that the threshold can be pre-configured into the system, set from an external source, or set manually. Next a determination is made 122 of a processing parameter. In this case, the parameter preferably has two binary states; either to enable the water processing when the water hardness is greater than the threshold or to disable the water processing when the water hardness is less that a detected threshold.

Next the water processing step 130' is performed. First, a decision is made whether the water processing unit needs to be regenerated 131. This decision can be based on the parameters mentioned previously such as time periods, hours of use, use heuristics, and time of use weighted by a scaled water hardness. Water hardness reduction technology such as electrochemically assisted ion exchange become saturated with ions associated with water hardness. The regeneration process is as described as above. Next, a decision is made 133 based on the determined processing parameters 122. If the parameter indicates that the water hardness is above the threshold, then the water processing device is enabled 134 to remove ions. If the water hardness is below a threshold, then the water processing device is disabled 135. One skilled in the art will appreciate that the enabling and disabling of the water processing device can be done either by controlling the flow of water through the device or by controlling the anode and cathode voltage to an electrochemical assisted ion exchange water processing device.

Figure 1C:
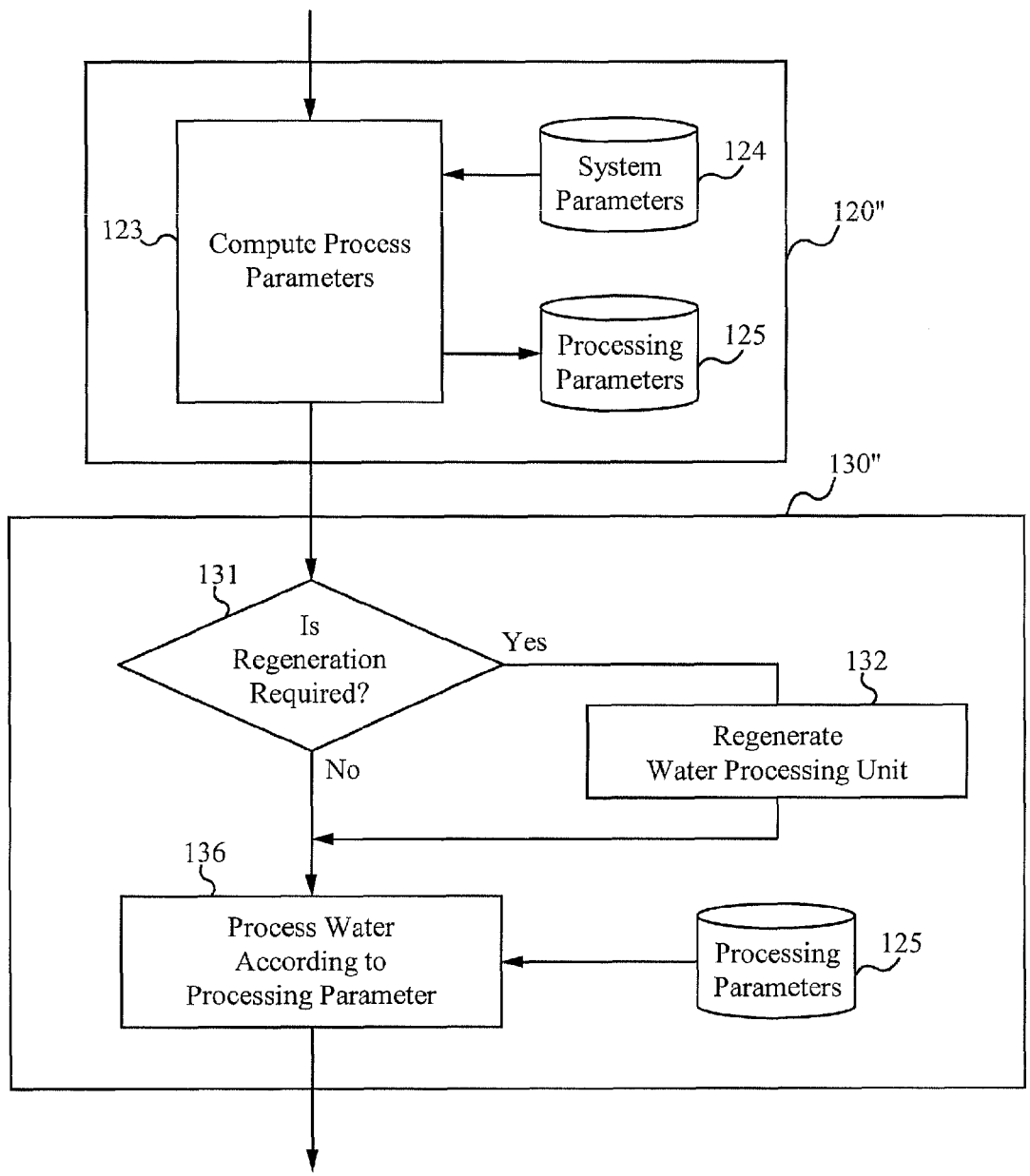
FIG. 1C is a flow chart illustrating the steps for regulating water hardness where a set of system parameters is used to determine a set of water processing parameters.

FIG. 1C illustrates a more advanced implementation of the method steps, "determining the processing parameters" 120" and "processing the water according to processing parameters" 130". The implementation of the step for "determining processing the system parameters" 120" includes "computing the processing parameters" 123, which can be stored 125, based on a set of system parameters 124, which can include a system specified periodic time intervals, heuristics on the water hardness, a record of the cumulative number of hours since the last regeneration or user configured parameters such as but not limited to the size of the recreational body of water. These processing parameters 125 are stored in the system for use in a later step. Next the step of water processing 130" is performed. First, a determination is made whether the water processing unit needs to be regenerated 131. This decision can be based on the system parameters mentioned previously such as time periods, time of use, use heuristics, and time weighted by the water hardness cumulation of processing time. These usage parameters can be stored 124 in volatile or non-volatile memory for later use. A non-volatile memory is used to preserve the parameters after a power loss. If it is determined that the water processing unit is to be regenerated, then the regeneration step 132 is executed. The regeneration process is preferably the process described in the step 132 FIG. 1B. The next step is to process the water 136 according to the processing parameters 125 determined in step 123. Water processing 136 is based on an electrochemically assisted ion exchange process. The processing parameters 125 can include processing time sequences, processing time durations, and processing rates. It is within the scope of this invention that the processing parameters can indicate that no water processing shall occur. The water processing step 136 includes control of any valves or pumps required to control the water processing. One skilled in the art will appreciate that the control of the water processing device can be provided by but not limited to controlling the flow of water through the device or by controlling an electrical voltage to an electrochemical assisted ion exchange water processing device.

Figure 2:
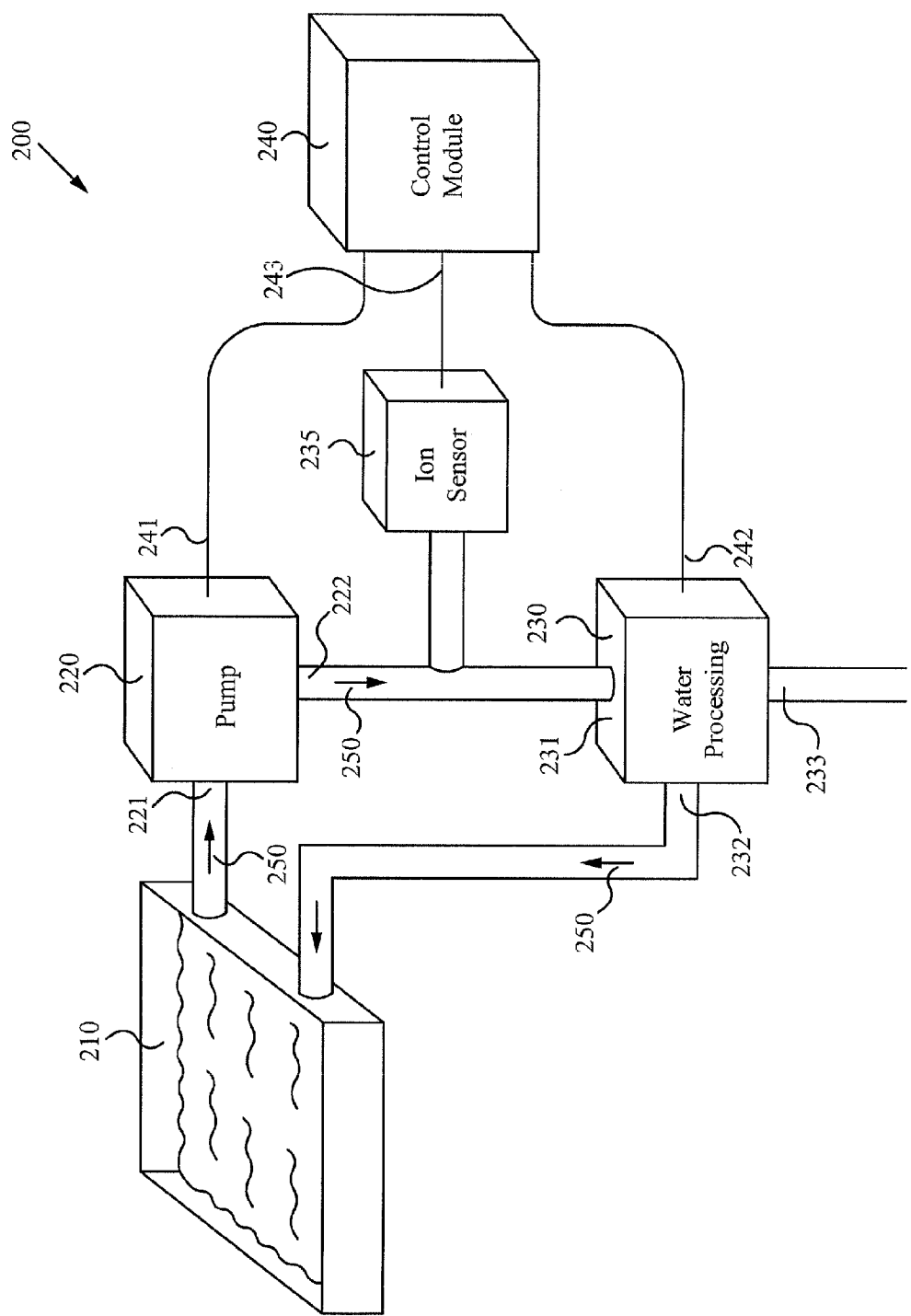
FIG. 2 is a drawing of an automated water hardness regulation system using the process of FIG. 1A, in accordance with the preferred embodiment of the present invention.

FIG. 2 illustrates a system for the regulation of the water hardness 200 of the recreational body of water 210. The system comprises a body of water 210 that is coupled to a water processing device 230 through a flow path 250 for the processing of the recreational body of water 210 to regulate the water hardness. A flow path 250 is formed between the body of water 210 and the water processing device 230 as shown by the flow path 250. A pump 220 is located along the flow path 250 which provides a means for moving the water through the flow path 250. The inlet to the pump 221 is coupled to the recreational water source 210. The outlet of the pump 222 is coupled to the water processing unit 230 through the inlet 231. It will be appreciated that within the water processing system 230 that there can be valves (not shown) to control the rate of flow of water through the electrochemically assisted ion exchange water hardness reduction device or shunt water from being processing. It will be appreciated that the connection between the body of water 210, the pump 220, and the water processing device 230 can be through other means including pipes, trenches, directly connected to the body of water 210, or any other means by which a body of water 210 can be connect to the pump 220, the pump to the water processing unit 230, or the water processing 230 to the body of water 210. Also coupled to the flow path 250 is a water hardness sensor, preferably an ion sensor 235. The ion sensor 235 produces a signal that can be used to determine an overall water hardness level or to determine a level of specific ions in the water such as calcium. Controlling the water processing unit 230, the pump 220, the water processing unit 230, and valves (not shown) required for the operation of the water processing is a controller module 240. Further, the controller module 240 is coupled to the output of the ion sensor 235 where the input 243 is used in the determination of an estimated water hardness level. A pathway 233 is coupled to the water processing unit 230 for directing the regeneration effluent away from the recreational water facility. It will be appreciated that the coupling of control signals between the controller module and the pump, or valves, or water processing apparatus can be a wireless connection.

Figure 3:
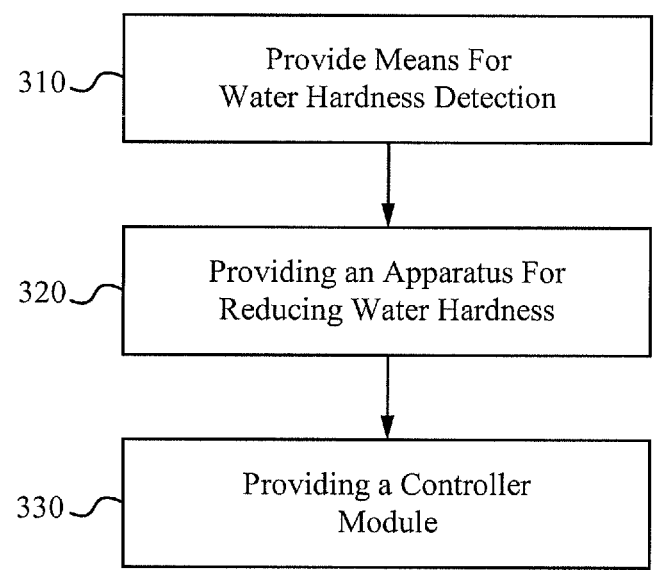
FIG. 3 is a flow chart of the manufacturing process for a water hardness regulation system, in accordance with an embodiment of the present invention.

FIG. 3 illustrates the method for the manufacture of a system for the regulation of water hardness 300 in a recreational water of body. In step 310, a means for detecting the hardness of the water is provided. This device can be but is not limited to a general ion detection device or can be an ion specific detection device such as a calcium detection device. The invention also contemplates the use of chemicals, weighing or any other technique for the measurement of water hardness. The water hardness detection device will be coupled to the recreational body of water through pipes at some point in the processing flow path. The next manufacturing step is providing a device for reducing the water hardness 320. This device is preferably based on an electrochemically assisted ion exchange. The device has a regeneration process where the waste or effluent from regeneration is flushed from the system and kept separate from the recreational body of water. The next step is to provide a controller module 330 where the module is coupled to the water hardness sensor, the water processing device, and any pumps and valves as required by the system.

Figure 4:
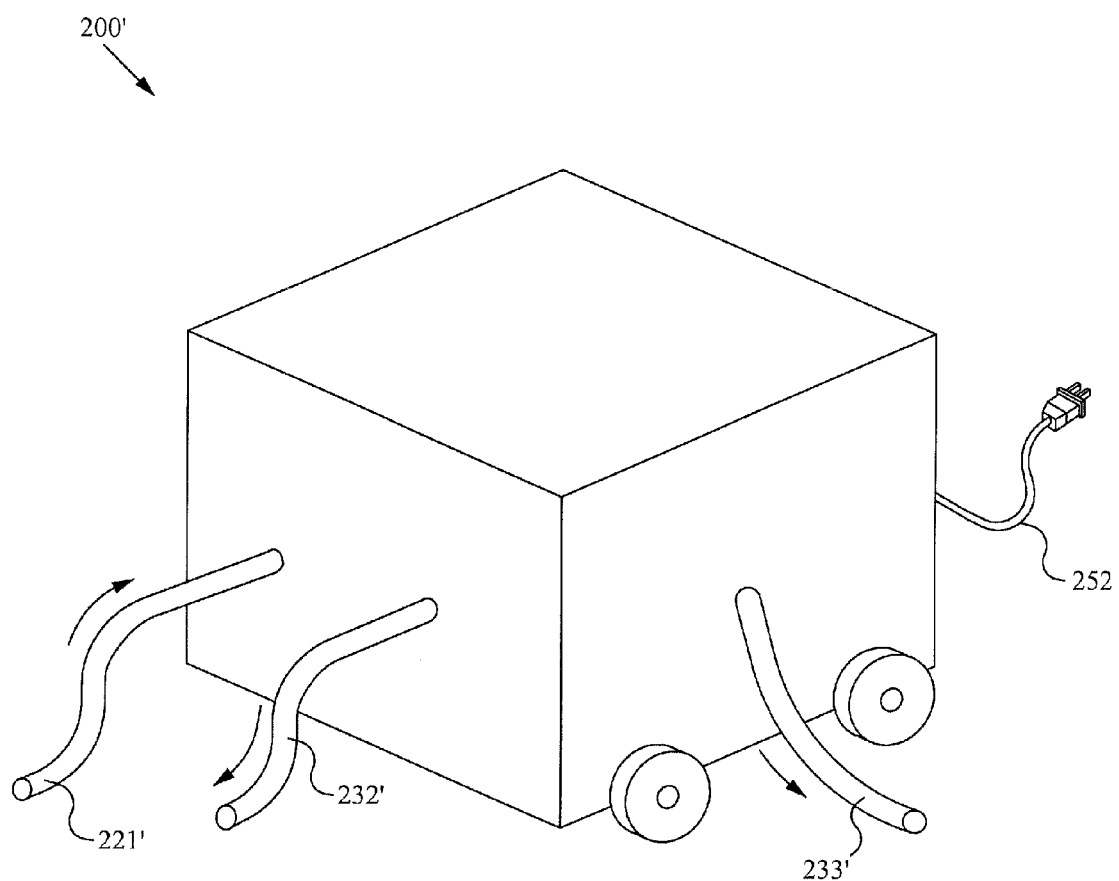
FIG. 4 shows a portable embodiment of the system of FIG. 2.

Those of ordinary skill in the art will recognize that regulating the hardness of water in a recreational body of water 210 need only be done occasionally. Preferably, the system of FIG. 2, can be manufactured within a cart 200' as a portable tool as shown in FIG. 4. A flexible hose 221' can be coupled to the cart 200' to draw water from the recreational body of water using a pump, as shown in FIG. 4. A flexible hose 232' can be coupled to the cart 200' to return processed water to the recreational body of water. The system on the cart 200' can be powered through an electric cord 252. Ion rich effluent can be discharged from the cart 200' through a flexible hose 233'. Such a cart 200' can be used to remove ions from multiple recreational bodies of water. A service provider can remove ions from a recreational body of water, remove the cart 200' to remote location and then regenerate the water processing unit 230 to collect ion rich effluent for subsequent handling.

It will be appreciated that embodiments described above of the present invention for the regulation of water hardness regulation system can be integrated into a larger system for overall system for the management of a recreational body of water which could include filtering, pH control, bacterial and fungus control.

Reference has been made in detail to the preferred and alternative embodiments of the invention, examples of which are illustrated in the accompanying drawings. While the invention has been described in conjunction with the preferred embodiments, it will be understood that they are not intended to limit the invention to these embodiments. On the contrary, the invention is intended to cover alternatives, modifications and equivalents, which can be included within the spirit and scope of the invention. Furthermore, in the detailed description of the present invention, numerous specific details have been set forth in order to provide a thorough understanding of the present invention. However, it should be noted that the present invention can be practiced without these specific details. In other instances, well-known methods, procedures and components have not been described in detail as not to unnecessarily obscure aspects of the present invention.

What is claimed is:

1. A method of regulating water hardness of a recreational body of water comprising the steps:

automatically determining a water hardness by using a calcium ion specific probe;

determining processing parameters, wherein the processing parameters are a function of a size of the recreational body of water, the water hardness and a target range of water hardness;

determining an amount of total dissolved solid in the recreational body of water;

preventing leaching of an aquatic facility by maintaining a lower leaching-preventing threshold level of the total dissolved solid; and processing the recreational body of water based on a processing rate or a processing sequence including a series of periods, time and flow processing rate generated based on the processing parameters, wherein the processing reduces the water hardness, wherein the processing uses an electrochemically assisted ion exchange process to reduce the water hardness.

2. The method of claim 1, wherein the electrochemically assisted ion exchange process removes at least calcium ions.

3. The method of claim 2, further comprising the step of electrochemical regeneration, wherein an effluent from regeneration is substantially isolated from the recreational body of water.

4. The method of claim 3, wherein a threshold water hardness value is set within a target water hardness range and if the determined water hardness is equal to or above the threshold, the water hardness is reduced by the electrochemically assisted ion exchange process.

5. The method of claim 3, wherein the time duration and rate of the electrochemically assisted ion exchange process are set as a function of the determined water hardness and of target water hardness range.

6. The method of claim 5, wherein the time duration and rate of the electrochemically assisted ion exchange process is further a function of system parameters.

7. The method of claim 2, wherein the determined water hardness is substantially a calcium ion content of the water.

8. A system for regulating recreational water hardness comprising:

a calcium ion specific probe automatically determining the water hardness and a level of total dissolved solid of a recreational body of water;

a water hardness reduction unit configured to prevent leaching of an aquatic facility by maintaining a lower leaching-preventing threshold level of the total dissolved solid, wherein the unit is in communication with the recreational water and is configured to remove ions based on an electrochemically assisted ion exchange process, wherein the water hardness reduction units processes the recreational body of water based on a processing rate or a processing sequence including a series of periods, time and flow processing rate generated based on processing parameters, wherein the processing parameters are a function of a size of the recreational body of water, the water hardness or a target range of water hardness; and an electronics control module in communication with the means for determining the water hardness and in communication with the water hardness reduction unit.

9. The system of claim 8, wherein the electrochemically assisted ion exchange process removes at least calcium ions or carbonate ions.

10. The system as in claim 9, wherein the water hardness reduction unit is capable of regeneration and wherein a regeneration effluent is substantially isolated from the recreational water.

11. The system as in claim 10, further comprising a recreational water inlet, a regulated water outlet, and a regeneration effluent outlet, wherein the system is configured as a portable unit.

12. The system as in claim 9, further comprising a sensor that detects a total dissolved solids level in determining the water hardness.

13. The system as in claim 8, wherein the electronic control module calculates if the determined water hardness is within a target water hardness range and if the determined water hardness is above a threshold, the water hardness reduction unit processes the recreational water.

14. The system as in claim 8, wherein the electronic control module calculates a time duration and a rate of operation of the water hardness reduction unit as a function of the determined water hardness and of the target water hardness range.

15. The system as in claim 14, wherein the time duration and the rate of operation of the water hardness reduction unit are further a function of system parameters.

16. A method of manufacturing of a system for regulating water hardness of a recreational body of water comprising the steps of:
   providing a means for automatically detecting water hardness by using a calcium ion specific probe, wherein the means is in communication with the recreational body of water;
   providing a means for automatically detecting a level of total dissolved solid in the recreational body of water;
   preventing leaching of an aquatic facility by maintaining a lower leaching-preventing threshold level of the total dissolved solid;
   providing an apparatus for reducing the water hardness, wherein the apparatus is in communication with the recreational body of water and is configured to use an electrochemically assisted ion exchange process;
   processing the recreational body of water based on a processing rate or a processing sequence including a series of periods, time and flow processing rate generated based on processing parameters, wherein the processing parameters are a function of a size of the recreational body of water, the water hardness or a target range of water hardness; and
   providing an electronic controller module, wherein the module is in communication with the sensor and the hardness reduction apparatus and wherein the controller modules control the operation of the hardness reduction apparatus.

17. The method of claim 16, wherein the apparatus for reducing water hardness includes a regeneration capability which produces a regeneration effluent that is kept separate from the recreational body of water.

18. The method of claim 17, wherein the apparatus for reducing water hardness is a portable unit.

\* \* \* \* \*